Nov. 10, 1959                C. D. ELLITHORPE                2,912,066
                          DRIVE-IN SERVICE APPARATUS
Filed Dec. 14, 1956                                        7 Sheets-Sheet 1

INVENTOR.
CLARENCE D. ELLITHORPE

BY
ATTORNEYS.

Nov. 10, 1959  C. D. ELLITHORPE  2,912,066
DRIVE-IN SERVICE APPARATUS
Filed Dec. 14, 1956  7 Sheets-Sheet 4

INVENTOR.
CLARENCE D. ELLITHORPE
BY
ATTORNEYS.

Nov. 10, 1959 C. D. ELLITHORPE 2,912,066
DRIVE-IN SERVICE APPARATUS
Filed Dec. 14, 1956 7 Sheets-Sheet 5

INVENTOR.
CLARENCE D. ELLITHORPE
BY
ATTORNEYS.

United States Patent Office 2,912,066
Patented Nov. 10, 1959

2,912,066

DRIVE-IN SERVICE APPARATUS

Clarence D. Ellithorpe, Milford, Conn., assignor, by mesne assignments, to The Mosler Safe Company, Hamilton, Ohio, a corporation of New York Application December 14, 1956, Serial No. 628,306

5 Claims. (Cl. 186—1)

This invention relates to a drive-in service apparatus enabling the quick transaction of business between a customer on the sidewalk, or in a parked car at a curb or in a parking lot, outside a business structure, and a clerk or the like at a remote location within the business structure, and is particularly directed to apparatus of the described character adapted for use in the handling of banking transactions.

A drive-in service apparatus of the described character generally includes a stand or kiosk projecting upwardly from street level adjacent a curb or other parking area and defining the customer's station, a room or counter within the bank or other business structure defining the remote station of the teller, clerk or other attendant handling the transaction with the customer, and systems for conveying or transferring articles back and forth between the two stations and for establishing oral communication between the parties to the transaction, respectively. When the drive-in service apparatus is to be employed in conducting banking transactions, it is particularly necessary to at least provide for visual identification of the customer by the teller, and it is preferable to provide a system for visual communication between the customer and teller in both directions. An existing drive-in service apparatus intended for the transaction of banking business provides a window in front of the teller's station through which the teller is to view the customer at the stand or kiosk, but such an arrangement is hardly satisfactory for the possible distance between teller's and customer's stations is then very limited, and identification of the cutomer is possible only when the stand or kiosk itself, or persons or vehicle between the customer and the teller, do not intercept the teller's line of vision. In another existing drive-in service apparatus, the teller's station is in a subterranean room disposed below the customer's stand or kiosk and the desired visual communication between the teller and customer is achieved with a system of mirrors, similar to that employed in a periscope, which also limits the possible distance between the teller and customer and their relative positions. Thus, the existing drive-in service apparatus intended for the transaction of banking business are not suitable for relatively large distances between the teller's and customer's stations, or where the relative positions of such stations do not satisfy the peculiar requirements of their respective visual communication systems.

Further, in drive-in service apparatus, particularly when such apparatus is intended for the transaction of banking business, operation of the system for conveying or transferring articles between the customer's station and the attendant's or teller's station, and access to that conveying or transferring system at the customer's station, should be controllable only from the teller's station in order to avoid vandalism, tampering with the conveying system and the introduction therein of dangerous instruments, materials and the like. However, those existing apparatus which satisfy the above safety requirements employ relatively slow moving article conveying or transferring systems between the customer's and attendant's or teller's stations so that, if such stations are spaced apart by relatively large distances, much time is lost in transferring articles between the stations and the advantageous savings in time expected to result from the use of the drive-in service apparatus are lost, at least to some extent.

Accordingly, it is an object of the present invention to provide a drive-in service apparatus that may be safely employed for the rapid transaction of banking business between a customer and a teller at widely separated stations which are out of sight of each other, and without restriction upon the relative positions of the stations.

A more specific object is to provide a drive-in service apparatus of the described character including systems for rapidly conveying or transferring articles, and for establishing two-way oral and visual communication, respectively, between a customer's station at any location outside of a bank or other business structure, for example, at a curb or in a parking area, and an attendant's station at any location within the bank or other business structure, such systems being controlled exclusively from the attendant's station to provide the degree of safety requisite for the use of the apparatus in the transaction of banking business.

In accordance with an aspect of the invention, the desired oral and visual communication between the customer and teller or attendant are attained with electronic, closed circuit audio and television systems, which include a microphone and speaker and a television camera and monitor or receiver at each of the customer's and attendant's stations, and suitable circuitry and electronic components all controllable from the attendant's station so that the clarity of the oral and visual communication between the customer and attendant is independent of the distance between, or the relative positions of, the respective stations.

An advantageous feature of a two-way closed circuit television system employed to establish visual communication between the customer and attendant is the provision of an arrangement in that system for connecting the television receiver or monitor at the attendant's station in parallel with the monitor at the customer's station so that the picture normally viewed at the customer's station will appear on the screen of the monitor at the attendant's station and can be observed by the attendant while the latter manipulates the controls for adjusting the quality of the picture at the customer's station, which picture would not otherwise be visible to the attendant.

In accordance with another aspect of the invention, the transfer of articles between the customer's station and the attendant's station is effected by a pneumatic tube system which is capable of the rapid transfer of the articles over large distances and even along relatively tortuous paths made necessary by existing structures between the two stations, and wherein operation of the pneumatic tube system and access to the latter from the customer's station are controlled exclusively from the attendant's station to provide the safety conditions requisite for the use of such a system in the transaction of banking business.

In existing pneumatic tube systems, for example, of the kind in use in department stores for establishing communication between a central cashier's station and each of several remote sales stations, a carrier for the articles to be transported is moved through a conveyor tube between the stations either by air pressure or vacuum and falls free of the tube at each of the opposite ends of the latter. When the carrier is to be returned to the station from which it originated, it is necessary to open a valve through which the carrier is reinserted into the conveyor tube. If such a pneumatic tube system was employed in a drive-in service apparatus of the described character, it would be necessary for each customer to learn how to operate the system, particularly with regard to the steps required for effecting return of the carrier to the attendant's or teller's station. Further, the existing pneumatic tube system, in which the carrier falls free of the conveyor tube at both ends of the latter, would permit the customer to take the carrier with him upon leaving the customer's station, or merely to leave the carrier at the customer's station at the conclusion of the transaction in which case the attendant or teller could retrieve the carrier only by leaving his station and going out to the remote stand or kiosk defining the customer's station.

In accordance with a further aspect of the present invention, the above disadvantages of the standard or existing pneumatic tube systems, as applied to a drive-in service apparatus particularly adapted for the transaction of banking business, are avoided by providing such apparatus with a pneumatic conveyor system that includes a single conveyor tube extending between terminals at the customer's and attendant's stations, and a carrier that is movable by air pressure or vacuum through the single tube between the two stations under the exclusive control of the teller or attendant and is removable from the tube only at the terminal at the attendant's or teller's station. In order to permit the customer to insert articles in, and remove aricles from, the carrier while the latter is retained within the terminal of the conveyor tube at the customer's station, the carrier is provided with a hinged door which registers with an opening in the stand or kiosk defining the customer's station when the carrier is disposed at the related terminal of the conveyor tube. Further, the opening of the stand or kiosk has a hinged door which is automatically opened in response to the arrival of the carrier at the related terminal of the conveyor tube and which is automatically closed when the attendant or teller manipulates the controls at his station for effecting the return of the carrier from the customer's station to the teller's station.

The above, and other objects, features and advantages of the invention, will be apparent in the following detailed description of an illustrative embodiment thereof which is to be read in connection with the accompanying drawings forming a part hereof, and wherein:

Figs. 9 and 10 present a schematic wiring diagram for an electric control system included in the drive-in service apparatus of Fig. 1, the circuits of the two figures being interconnected by the lines broken at the right-hand side of Fig. 9 and the left-hand side of Fig. 10. The broken lines in the upper right-hand corner of Fig. 10, in turn, connect the circuits of that figure with the electrical lines diagrammed on Fig. 2.

Figure 1:
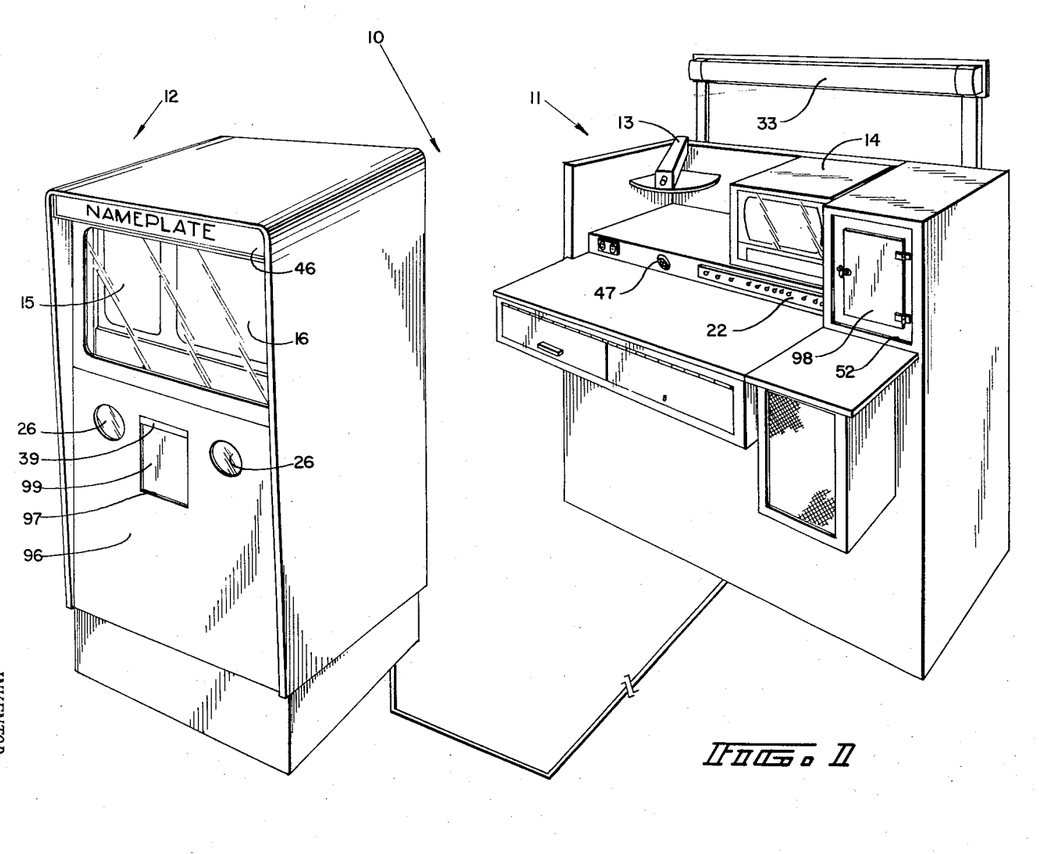
Fig. 1 is a perspective view of an attendant's or teller's station and of a remote stand or kiosk defining a customer's station in a drive-in service apparatus embodying the present invention, and with the connections between the two stations being schematically represented.

Referring to the drawings in detail, and initially to Fig. 1 thereof, a drive-in service apparatus embodying the present invention and particularly adapted for the transaction of banking business is there illustrated and generally identified by the reference numeral 10. The apparatus 10 includes an assembly 11 defining a teller's or attendant's station which is conveniently in the form of a counter and which may be disposed at any desired location within a bank building or other business structure, and a stand or kiosk 12 defining a customer's station which is outside the bank building or other business structure at any suitable location, for example, at a curb or in a parking lot, and which can be disposed at any desired distance from the teller's station 11 and even out of sight of the teller or attendant.

In order to permit the transaction of business, particularly banking business, between an attendant or teller at the station 11 and a customer at the remote station 12, the apparatus 10 includes systems for establishing two-way oral and visual communication and for transferring articles between the teller and the customer.

In accordance with this invention, two-way visual communication is established between the teller and the customer by a closed-circuit television system made up of conventional components and including, at the teller's counter or station 11, a television camera 13 focused on the teller positioned before the counter and a television monitor or receiver 14 disposed so as to be conveniently viewed by the teller, and, at the customer's station, a television camera 15 and a television monitor or receiver 16 disposed in an upper compartment 17 (Fig. 3) of the kiosk 12 behind a protective, shatter-proof glass panel 18 so as to respectively focus on, and be readily visible to, a customer standing, or seated in an automobile, in front of the kiosk 12. The cameras and monitors at the spaced apart stations are suitably connected so that all images picked up by the camera 15 at the customer's station are reproduced on the receiver 14 at the teller's station, thus enabling the teller to observe and identify the customer from his remote station, while the images picked up by the camera 13 are reproduced on the receiver 16, thereby making the teller visible to the customer during the handling of the transaction.

In employing a closed-circuit television system in apparatus of the described character for establishing two-way visual communication between the teller or attendant and the remotely located customer, several problems arise that are peculiar to such application of the television system. Since the kiosk 12 is disposed in an exposed location outside of the bank building or other business structure and, therefore, cannot be closely policed or watched over, it is necessary that all controls for the entire television system be arranged at the remote teller's station 11 thereby to prevent tampering with the television system. Another reason for providing all controls of the television system at the teller's station is to ensure the proper functioning of the system, and particularly the attainment of clear pictures on both receivers 14 and 16, without relying upon the ability of the customer to effect the necessary adjustments for that purpose. It is apparent that the lighting conditions at the customer's station may vary considerably and be substantially different from the lighting conditions at the teller's station so that the teller must be able to individually adjust the iris or lens openings of the cameras 13 and 15 to compensate for such varying light conditions. Further, since the distances between the cameras 13 and 15 and their respective subjects may vary, the teller must also be able to individually focus the two cameras.

Figure 10:
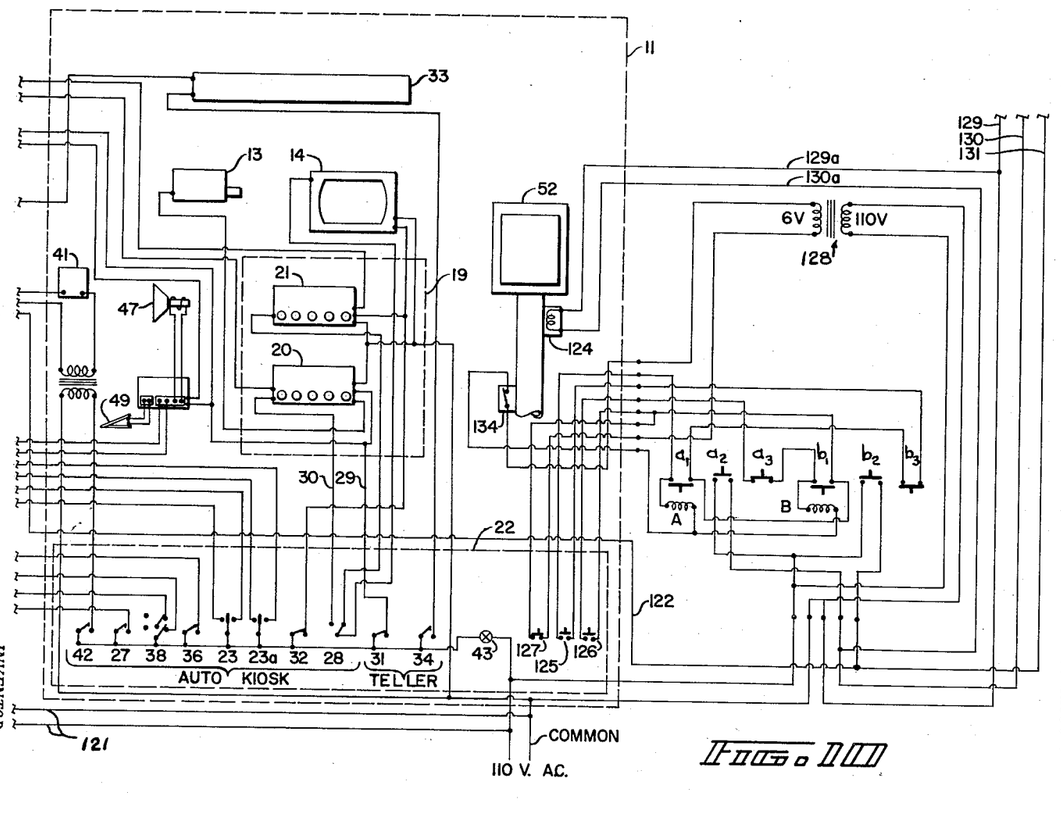

The usual electrical controls, connections and the like, for the cameras 13 and 15 and the receivers 14 and 16 of the closed circuit television system are contained in a ventilated housing 19 at the teller's station (Fig. 1) and are schematically represented at 20 and 21 in the wiring diagram of Figs. 9 and 10. The most used controls of the apparatus, including those used in connection with the closed-circuit television system, are disposed on a panel 22 (Figs. 1 and 10) within convenient reach of the teller. As seen in Figs. 9 and 10, a two-way switch 23 on the panel 22 is electrically connected between a power supply 129 and a reversible motor 24 in the kiosk 12 which, by way of a suitable transmission 25, is capable of adjusting the iris or lens opening of camera 15. When switch 23 is in its normal neutral position, as illustrated, the motor 24 is inoperative. However, when the movable contact of switch 23 is displaced to one of its closed positions, motor 24 causes enlargement of the lens opening of camera 15, thereby to compensate for poor lighting at the customer's station and, when the movable contact of switch 23 is displaced to its other closed position, motor 24 causes reduction of the lens opening to compensate for bright lighting at the customer's station. Similarly, a two-way switch 23a disposed on the panel 22 is interposed between the power supply and a reversible motor 24a which, by way of a suitable transmission 25a, is able to change the focus of camera 15 in one direction or the other, depending upon the position of switch 23a, thereby to compensate for the distance between the camera 15 and the customer.

Since the apparatus 10 may be operated after regular banking hours or during the evening, when the natural illumination available at the kiosk 12 may be insufficient to provide a clear picture of the customer upon the receiver 14, the kiosk 12 is provided with lights 26 (Figs. 1 and 9) at the front thereof operative to illuminate the customer. The lights 26 are controlled by a switch 27 on the panel 22 (Fig. 10) which is electrically interposed between the power supply 129 and the lights 26.

Since the picture on the receiver 16 of the kiosk 12 is not visible to the teller, the closed-circuit television system embodying the present invention includes an arrangement for presenting, on the receiver or monitor 14 at the teller's station, the image picked-up by the camera 13 at the same station so that the teller can view his own image while adjusting the camera 13 to ensure that a clear picture will thereafter be presented by the receiver 16. In order to achieve the above, a two-way switch 28, which is shown in its normal position on Fig. 10, is provided on the panel 22. In its normal position, switch 28 connects the receiver or monitor 14 to the conductor 29 leading from a connection of the camera 15 within the box 21 to the receiver 14 so that the latter normally presents the image picked-up by the camera 15 at the customer's station. However, when the movable contact of switch 28 is displaced into engagement with the fixed contact of the latter connected to a conductor 30 extending to a connection to the camera 13 within the box 20, the receiver 14 is then disconnected from the camera 15 and connected in parallel with the receiver 16 to the camera 13 to present the image picked-up by the latter at the teller's station.

Master switches 31 and 33 are also provided on panel 22 and are respectively interposed in the power supply to the camera 13 and the monitor or receiver 16, and in the power supply to the camera 15 and the receiver 14, so that visual communication in either direction may be interrupted by opening the corresponding one of the switches 31 and 32.

A lighting fixture 33 may be provided above the counter at the teller's station to provide adequate illumination, and such fixture is also controlled from the panel 22 by a switch 34 on the latter (Fig. 10).

Since the kiosk 12 is outside the main bank building or other business structure, it is exposed to severe changes in temperature, humidity and the like, which could adversely affect the operation of the components of the closed-circuit television system contained therein. In order to prevent the condensation of moisture, and to maintain a substantially uniform temperature, within the kiosk, the latter is provided with a ventilating fan or blower 35 controlled by a switch 36 on the panel 22 and having an associated electrical heating element 37 which is independently controlled by a switch 38 at the panel 22 so that the blower 35 can be operated alone in order to cool and ventilate the interior of the kiosk in warm or humid weather, or the blower 35 and heating element 37 can be operated together to heat and ventilate the interior of the kiosk in cold weather without causing the condensation of moisture within the kiosk 12.

In order that a customer, upon arriving at the kiosk 12, can alert the attendant or teller to his presence, a call button 39 is provided at the front of the kiosk and, when pushed, closes a switch 40 (Fig. 9) which is connected in series with a signal 41, for example, a signal light or audible alarm, at the teller's station. A control switch 42 on the panel 22 is also connected in series with the signal 41 so that the latter will be energized only if the switch 42 is closed at the time when a customer presses the call button 39.

A master or main switch 43 may also be provided on the panel 22 so that, by opening such main switch, the power supply to the switches 23, 23a, 27, 31, 32, 34, 36, 38 and 42 may be interrupted.

The kiosk 12 is provided with lights 44 and 45 (Fig. 9), in addition to the previously mentioned lights 26, for illuminating a nameplate 46 (Fig. 1) on the front face of the kiosk and for illuminating the terminal, at the kiosk or customer's station, of a pneumatic tube system that is hereinafter described in detail. These lights also serve as a means of keeping the interior of the kiosk heated so that condensation of moisture will not occur on the electrical components and parts of the camera and receiver in the kiosk.

In order to establish two-way oral communication between the customer and the teller or attendant, the apparatus 10 has an electronic audio system made up of conventional components that include a microphone and speaker 47 at the teller's station 11 and a microphone and speaker 48 at the kiosk 12 or customer's station, with suitable connections being made therebetween so that the customer's voice received by the microphone in kiosk 12 will issue from the loudspeaker at the teller's station 11, while the teller's voice picked up by the microphone at the teller's station will issue from the loudspeaker at the customer's station.

Preferably, as seen in Fig. 10, a foot controlled switch 49 is provided at the teller's station by which the teller can conveniently control operation of the oral communication system. Further, it will be seen that the switch 31 at the panel 22, which acts as an on-off switch for the television camera 13 and receiver 16, performs the same function for the oral communication system.

Although the above described two-way visual and oral communication systems are capable of performing their respective functions without regard to the distance between, or relative positions of, the teller's and customer's stations, such freedom in the placement or relative positioning of the stations is finally dependent upon the provision of a system for transferring articles between the stations that can cover large distances at relatively high speeds and that is controllable exclusively from the teller's station to provide the safety requisite for the employment of the apparatus in transacting banking business.

In accordance with the present invention, the transferring of articles between the teller's station 11 and the kiosk or customer's station 12 is effected by a pneumatic tube system 50 (Fig. 2) that includes a single tube or conduit 51 extending between a terminal 52 at the teller's station and a terminal 53 in the kiosk 12, and a carrier 54 which is movable by air pressure or vacuum through the tube 51 between the stations and adapted to contain the articles to be transferred. An air line 55 is connected between the terminal 52 at the teller's station and a compressor and gate valve assembly 56 that is controllable by the teller and operative to produce a strong flow of air through tube 51 either in the direction from the terminal 52 to the terminal 53, as represented by the solid arrows, or in the reverse direction, that is, in the direction from the terminal 53 to the terminal 52, as represented by the broken arrows.

Figure 2:
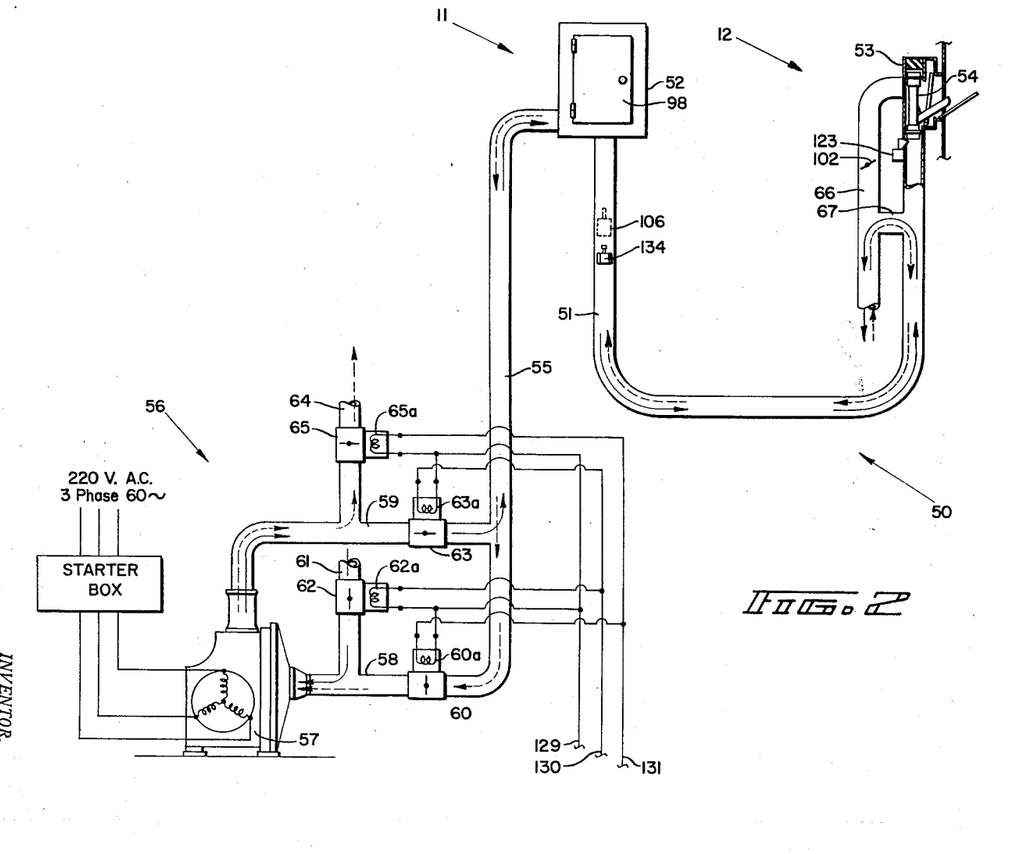
Fig. 2 is a schematic view of a pneumatic tube system provided, in accordance with the invention, for conveying or transferring articles between the customer's and the attendant's stations of the apparatus of Fig. 1.

The assembly 56 includes a compressor or blower 57 having its inlet and outlet connected to the air line or pipe 55 by pipes 58 and 59, respectively. A gate valve 60 is interposed in the pipe 58 and a pipe 61, opening to the atmosphere, branches off from the pipe 58 between the gate valve 60 and the inlet to compressor 57. A gate valve 62 is interposed in the pipe 61. Similarly, the pipe 59 has a gate valve 63 therein and a pipe 64 branching off from the pipe 59 between the gate valve 63 and the outlet of compressor 57 and opening to the atmosphere, with a gate valve 65 being interposed in the branch pipe 64.

When the gate valves 60 and 65 are open and the gate valves 62 and 63 are closed, air is drawn from the air line or pipe 55 through the pipe 58 into the inlet of compressor 57 and is discharged from the outlet of the latter through the open gate valve 65 and the branch pipe 64 opening to the atmosphere, thereby to draw air through the tube 51 in the direction indicated by the broken arrows, that is, in the direction from the terminal 53 at the customer's station to the terminal 52 at the teller's station. Conversely, when the positions of the gate valves are reversed, that is, when the valves 62 and 63 are opened and the valves 60 and 65 are closed, air is drawn into the inlet of compressor through the open gate valve 62 and the branch pipe 61 opening to the atmosphere, while the compressed air issuing from the outlet of the compressor 57 is conducted to the pipe 55 through the pipe 59 and the open gate valve 63 in the latter thereby to push air through the tube 51 in the direction of the solid arrows, that is, in the direction from the terminal 52 at the teller's station to the terminal 53 at the customer's station.

As seen in Fig. 2, and in greater detail in Fig. 3, a conduit 66 opening to atmosphere is connected to the terminal 53 of the tube 51 within the kiosk 12, and is further connected to the tube 51 by a by-pass 67 located below the terminal 53 so that, when the air flow through the pipe or tube 51 is in the direction toward terminal 53, as described above, air will be discharged from the pneumatic tube system 50 through the conduit 66, and, when the compressor and gate valve assembly 56 causes air flow through the tube 51 in the direction toward the terminal 52, as described above, air is drawn into the pneumatic tube system through the conduit 66.

When air flows through tube 51 in the direction of the solid arrows (Fig. 2), a carrier 54 in tube 51 is propelled through the latter from terminal 52 to terminal 53, and, conversely, when the air flow through tube 51 is in the direction of the broken arrows, the carrier 54 is thereby returned from terminal 53 to the terminal 52 at the teller's station. The control of the direction of air flow through the tube 51 is effected from the teller's station, as will hereinafter appear in detail.

If the carrier 54 is removable from the pneumatic tube system 50 at both terminals 52 and 53 thereof, as in the usual pneumatic tube systems, the operation of the system for transferring articles between the customer and teller could no longer be under the exclusive control of the teller, and the customer would have to learn the steps required for reinserting the carrier in the pneumatic tube system at the terminal 53. Further, after the carrier 54 had been removed from the pneumatic tube system by the customer, the possibility would exist that the customer could carry away the carrier upon completion of the transaction or merely fail to reinsert the carrier in the terminal 53 so that the carrier 54 could then be retrieved by the teller only by leaving his station within the bank building and going out to the remote kiosk or customer's station.

In order to avoid the above, the carrier 54 of the system 50 embodying the present invention is removable from the tube 51 only at the terminal 52 at the teller's station. Since the carrier 54 is not also removable from the tube 51 at the customer's station, it is necessary to provide a carrier of special construction so that the customer can gain access to the interior of the carrier while the latter is disposed in the terminal 53.

Figure 5:
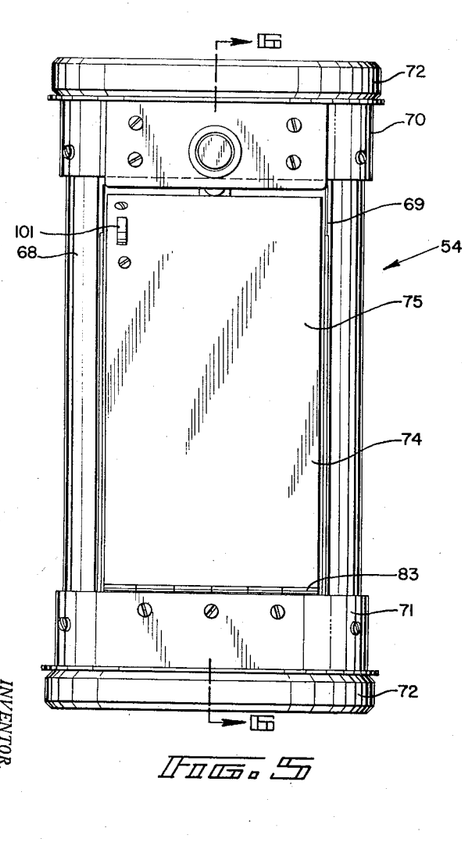
Fig. 5 is an enlarged side elevational view of a carrier movable through the pneumatic tube system of Fig. 2 and adapted to contain the articles to be transferred between the customer's and attendant's stations.
Figure 6:
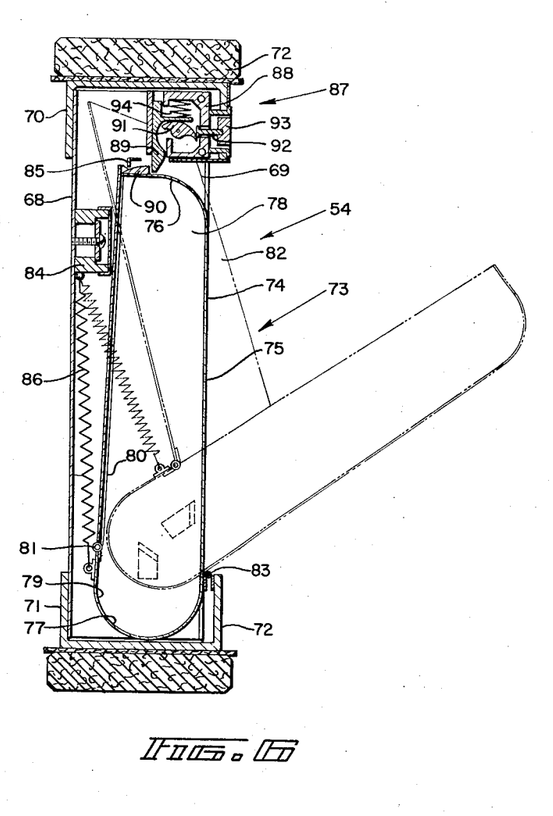
Fig. 6 is a detail sectional view taken along the line 6—6 of Fig. 5.

Referring now to Figs. 5 and 6, it will be seen that the carrier 54 includes an elongated, hollow body or housing 68 which is preferably of generally oval cross-sectional configuration and open at one side, as at 69. End members 70 and 71 are secured to the opposite ends of housing 68 and carry suitable seals or packings 72 for closely engaging the inner wall surface of tube 51 which, of course, has a cross-sectional configuration corresponding to that of the carrier.

A container for the articles to be transferred, which is generally identified by the reference numeral 73, includes a box-like portion 74 having a wall 75 dimensioned to extend across the opening 69 and act as a door for the latter, end walls 76 and 77, and opposite side walls 78, the end wall 77 being reverted, as at 79, and extended generally parallel to the wall 75 for a minor portion of the length of the latter, so that the box-like portion 74 has an opening defined by the free edges of side walls 78, end wall 76 and the reverted portion 79 of end wall 77. The container 73 further includes a cover 80 for the opening of box-like portion 74 which is hingedly connected to the latter, as at 81, and preferably has side walls 82 (appearing in broken lines on Fig. 6) adapted to overlap the outside surfaces of the side walls 78 of the box-like portion when the cover 80 is in its closed positions as indicated in solid lines on Fig. 6.

Figure 3:
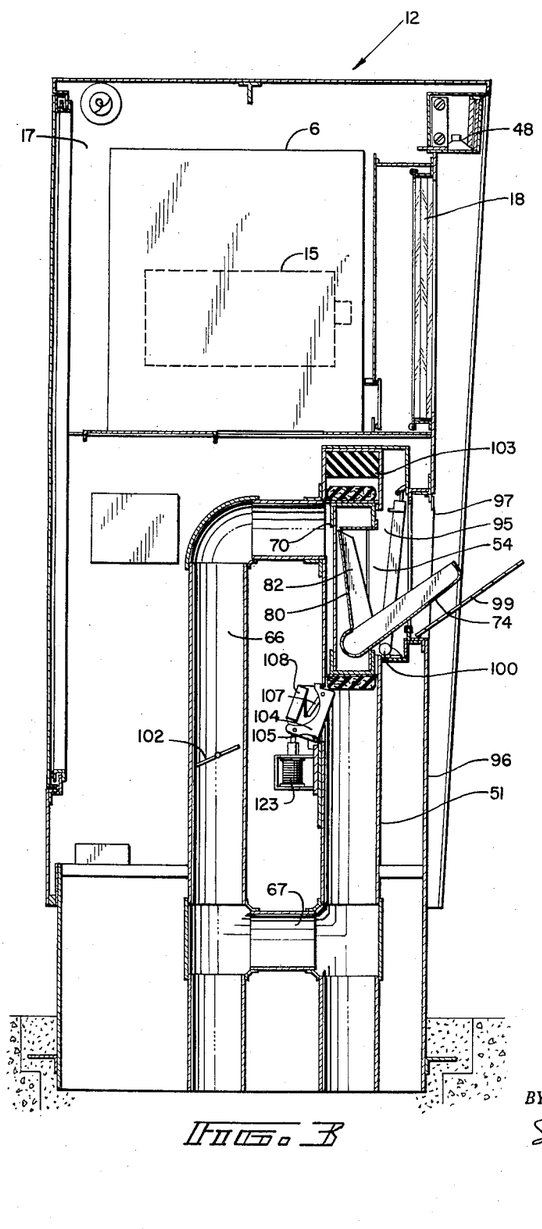
Fig. 3 is an enlarged, vertical sectional view taken through the center of the kiosk of Fig. 1, and particularly showing the terminal of the pneumatic tube system of Fig. 2 at the customer's station.

The container 73 is pivotally mounted within the housing 68 of carrier 54 by a hinge 83 that is secured to the end member 71 along the related edge of opening 69 and to the wall 75 of box-like portion 74 adjacent the end wall 77 of the latter, so that the box-like portion 74 can swing between a closed position which is shown in full lines on Fig. 6 and wherein the box-like portion is wholly contained within the housing 68 with the wall 75 closing opening 69 of the housing and with the cover 80 being held in its closed position relative to the box-like portion 74 by a bumper 84 within the housing 68, and an open position, shown in broken lines on Fig. 6 and in full lines on Fig. 3, wherein the box-like portion 74 swings out of the housing 68 through the opening 69 of the latter while the cover 80 is held within the housing 68, for example, by a member 85 extending across the latter to be engaged by the free end edge of the cover. Thus, when the box-like portion 74 pivots, relative to the housing 68, to its open position, the cover 80 is simultaneously opened to permit access to the interior of the portion 74 through the opening of the latter.

A spring 86 is connected between the box-like portion 74 and the housing 68, and yieldably urges the box-like portion of container 73 to its above described open position. A latch assembly 87 (Fig. 6) is provided for normally holding the box-like portion 74 in its closed position within the housing 68 and includes a latch housing 88 carried by the end member 70, a latch 89 slidably mounted in the housing 88 and adapted to project out of the latter toward the end wall 76 for engagement in front of a keeper 90 on the end wall 76. A cam release 91 is pivotally mounted within the housing 88 to act upon the latch 89 for retracting the latter into the latch housing, and the cam release is, in turn, acted upon by a slidable plunger 92 which extends out of the latch housing adjacent opening 69 of the carrier housing and carries a push button 93. A spring 94 may be interposed between the housing 88 and latch 89 to urge the latter to its extended position, as shown, where latch 89 engages keeper 90 and prevents pivotal movement of box-like portion 74 to its open position by the spring 86. However, when the button 93 is depressed or moved inwardly, plunger 92 pivots cam 91 and the latter, in turn, retracts latch 89 to release keeper 90 and permit spring urged movement of box-like portion 74 to its open position.

As seen in Fig. 3, the terminal 53 of tube 51 extends vertically within the kiosk 12 and has an opening 95 at the side thereof facing toward the front wall 96 of the kiosk, the opening 95 being smaller than the carrier 54, so that the latter cannot be removed from terminal 53 by the customer, but being large enough to permit the box-like portion 74 of the carrier container to project forwardly therethrough when portion 74 moves to its open position.

The front wall 96 of kiosk 12 has an opening 97 generally registering with the opening 95 of terminal 53 so that the open box-like portion 74 of a carrier at the terminal 53 can also project forwardly through the opening 97 for easy access thereto by a customer.

The end of tube 51 within the terminal 52 at the teller's station 11 has an opening 52a (Fig. 4) therein which is large enough to permit the insertion and removal of carrier 54 therethrough, and terminal 52 has a hinged door 98 (Figs. 1, 2 and 4) disposed in front of the opening 52a so that, when door 98 is opened, access can be had to the opened end of tube 51 within terminal 52 and, when door 98 is closed, the terminal 52 provides a closed communication between tube 51 and pipe 55 which both open into the terminal. It is apparent that the carrier 54 is always to be inserted in tube 51 at terminal 52 so that, when the carrier reaches the opposite terminal 53, the end member 70 will be uppermost in order to ensure that the box-like portion 74, upon movement to its open position projecting through the openings 95 and 97, will open generally upwardly to avoid spilling of its contents.

A door 99 is provided for normally closing the opening 97 in the front wall of kiosk 12, and is pivotally mounted at its lower edge to swing between a vertical, closed position and a forwardly inclined, opened position which is shown in Fig. 3. As will hereinafter appear in detail, the opening and closing of door 99 is automatically effected so that, when the carrier 54 arrives at terminal 53, the door 99 is moved from its normally closed position to the opened position, and when the teller or attendant actuates the controls for returning the carrier from the customer's station to the teller's station, the door 99 is first closed before movement of the carrier out of terminal 53 is possible.

In the event that the customer neglects to return the box-like portion 74 of carrier 54 to its closed position within the carrier housing 68, the closing movement of door 99, prior to return of the carrier from terminal 53, will partially close the box-like portion 74 and, during the initial downward movement of the carrier from terminal 53, the partly open box-like portion will ride against a roller 100 adjacent the bottom edge of opening 95 and be thereby more fully closed. Further, a roller 101 (Fig. 5) is rotatably mounted on wall 75 of the box-like portion 74 and projects outwardly from the latter for rolling contact with the inner surface of tube 51 in the event that the latch assembly 87 fails to hold the box-like portion in its fully closed position, whereby the roller 101 ensures that, during travel through the tube 51, the container 73 of carrier 54 will be closed sufficiently to prevent the loss of small articles, for example, coins or the like.

Since the air pressure or vacuum action on the carrier 54 is capable of causing the latter to travel at a relatively high speed through the tube 51, it is necessary that the carrier speed be reduced as it nears the terminals 52 and 53, that the stop of the carrier be cushioned, and that the carrier be thereafter accurately located within the terminal to facilitate access thereto through the terminal opening.

Referring to Fig. 3, and assuming that the carrier 54 is traveling from terminal 52 to terminal 53 by reason of air flow through tube 51 in the direction of the arrows, it is apparent that, after the carrier moves past by-pass 67, the compressed air behind the carrier can escape from tube 51 through the by-pass into pipe 66, and then from the latter to the atmosphere so that the pressure propelling carrier 54 is decreased. Further, an adjustable damper or throttle 102 is provided in pipe 66 above by-pass 67 so that, after the carrier has passed by-pass 67 and nears the terminal 53, the escape of air from the latter through pipe 66 is controlled by the damper, whereby a regulated compression of air takes place in terminal 53 above carrier 54 to bring the latter to a cushioned halt against a resilient bumper 103 at the top of the terminal.

In order to accurately position carrier 54 in terminal 53, a latch 104 is rockably mounted, as at 105, and arranged to yieldably project into terminal 53 of tube 51 and be engaged by the lower end of the carrier which is thereby supported on projecting latch 104. As the carrier moves into terminal 53, it will depress a retractable latch 104, and the latter is located a distance below the bumper 103 greater than the length of carrier 54 so that, when the carrier strikes against the bumper, the latch is released by the carrier to again project into the terminal and prevent downward movement of the carrier by gravity beyond the position established by latch 104.

A latch 106, similar to latch 104 described above, is also provided in the tube 51 at a location immediately below terminal 52 at the teller's station to positively position the carrier 54 when the latter arrives at the related terminal.

As seen in Fig. 3, a bell-crank 107 is pivoted on latch 104 with one arm thereof normally projecting above the top surface of the latch and the other arm being engageable with the actuator of a limit switch 108 mounted on latch 104. However, when a carrier 54 in terminal 53 rests upon latch 104, as in Fig. 3, the weight of carrier 54 rocks bell-crank 107 in the direction causing limit switch 108 to complete an electric circuit to a motor 109 for operating the service door 99 of kiosk 12.

Figures 7, 8:
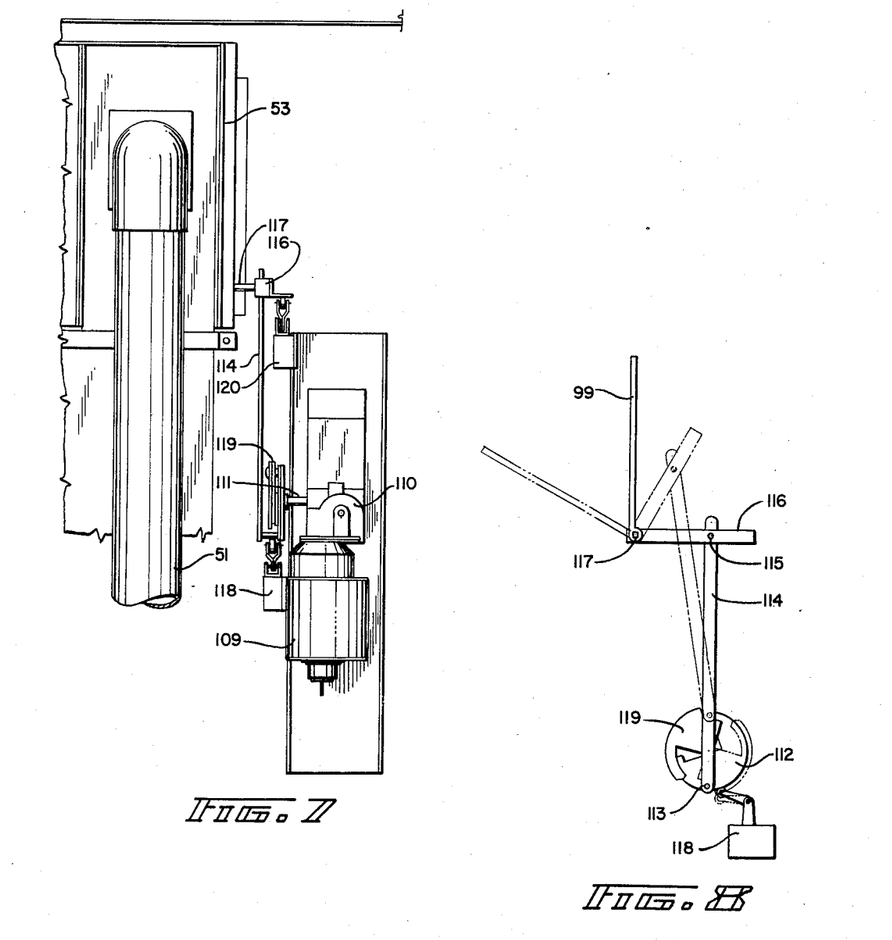
Fig. 7 is a back elevational view of the terminal of the pneumatic tube system at the customer's station.
Fig. 8 is a side elevational view of a door operating assembly included in the structure shown in Fig. 7.

Preferably, as seen in Fig. 7, the motor 109 has its shaft connected to a suitable speed reducing worm gear drive in a housing 110, and a shaft 111 driven at low speed extends from the reduction gear housing and constitutes a mounting and driving element for a disc assembly 112. The assembly 112 (Fig. 8) has an eccentric pivotal connection at 113 with one end of a rigid link 114, which, at its other end, is pivotally connected at 115 to an arm 116 extending radially from a shaft 117 on which door 99 is rockably mounted.

At one operative position of the door actuating apparatus, the eccentric connection at 113 lies to the side of shaft 111 away from the connection 115 to arm 116, with the door 99 in closed position, as shown in full lines on Fig. 8, and with pivots 113 and 115 substantially on a line through the axis of shaft 111. On the other hand, a rotation of eccentric pivot 113 about the axis of disc assembly 112 through a half revolution produces an upward thrust on arm 116 to rock door 99 to its open position, as shown in broken lines on Fig. 8, and, in that position, a line through pivots 113 and 115 again substantially extends through the axis of shaft 111. Thus, with the door 99 in either its opened or closed position, a force applied to the door cannot change the position of the latter, since the resulting force on link 114 then merely acts directly against and is absorbed by the axially fixed disc assembly 112.

In order to permit slipping of the connection between motor 109 and door 99 during the movement of the latter between its opened and closed positions, thereby to avoid damage to the door operating mechanism, when movement of the door is obstructed, or injury to the obstructing object, the disc assembly 112 is constructed with relatively rotatable driven elements, one connected in fixed relation to the link pivot 113 and the other connected in fixed relation to the shaft 111, and torque limiting means interconnecting these driven elements and adapted to yield to allow independent turning of the driven elements whenever the torque load on the disc assembly exceeds a predetermined desired limit, as more particularly described and illustrated in my prior, co-pending application for United States Letters Patent Serial No. 256,627, filed November 16, 1951.

In order to obtain an automatic control of the desired positions of door 99, a limit switch 118 is mounted below the disc assembly 112 and is engageable by an arcuate cam 119 rotatable with the eccentric pivot 113. The limit switch 118 has free and depressed positions and the cam 119 is arranged and dimensioned so that switch 118 is in its normal or free position when door 99 is in its closed position and continues thus during movement of the door to its open position. When door 99 reaches its open position, cam 119 then depresses switch 118 and holds the latter in its depressed condition during movement of door 99 from its opened position toward its closed position, whereupon cam 119 again frees switch 118. A second limit switch 120 (Fig. 7) is mounted adjacent the path of arm 116 and is depressed by the latter only when door 99 is in its fully closed position.

Referring now to the schematic wiring diagram of Fig. 9, wherein the depressed positions of the movable contacts of limit switches 108, 118 and 120 are indicated with full lines and the free positions of such movable contacts are indicated with broken lines, it will be seen that, when a carrier 54 arrives at terminal 53 and depresses limit switch 108 while switch 118 is in its free position, by reason of the door 99 being in its closed position, a circuit is completed through switches 108 and 118 to energize motor 109 from a source of power 121, thereby to cause opening of door 99. When door 99 reaches its open position and cam 119 depresses limit switch 118, the circuit between the series connected contacts of switches 108 and 118 is broken, and the operation of motor 109 is interrupted accordingly.

When a conductor 122 extending to the movable contact of limit switch 120 is connected to a source of power supply, in the manner hereinafter described in detail, and the door 99 is in its open position with a carrier resting on latch 104 to depress limit switch 108 thereof, a circuit for operating motor 109 is then completed through limit switch 120, in its free position, and limit switch 108, in its depressed position, so that the motor 109 causes closing movement of door 99. When door 99 reaches its closed position, limit switch 120 is depressed, thereby breaking the circuit from conductor 122 through limit switches 120 and 108, so that the motor 109 is again de-energized.

As previously mentioned, latches 104 and 106 are provided at the terminals 52 and 53, respectively, for holding a carrier at a predetermined position within the related terminal. Solenoids 123 and 124 have their armatures pivotally connected to the latches 104 and 106, respectively, so that the latch 104 or 106 will be retracted out of the related terminal 53 or 52 when the related solenoid is energized, thereby to permit movement of a carrier 54 away from the related terminal.

In order to ensure that a carrier 54 in terminal 53 of kiosk 12 will not leave that terminal until the service door 99 has attained its fully closed position, the solenoid 123 for retracting latch 104 out of the path of the carrier is arranged (Fig. 9) to be energized from conductor 122 through limit switch 120 only when the latter is depressed by arm 116 in response to full closing of door 99.

In accordance with the present invention, the positions of gate valves 60, 62, 63 and 65, of the gate valve and compressor assembly 56, which control the direction of air flow through tube 51 are controllable from the teller's station 11, for example, by pressing one or the other of two normally open push button switches 125 and 126 on panel 22. The switch 126, when closed, is intended to cause travel of carrier 54 from terminal 53 at the customer's station or kiosk 12 to terminal 52 at the teller's station 11, while closing of switch 125 by the teller is intended to cause travel of carrier 54 from terminal 52 through tube 51 to terminal 53.

As seen in Fig. 9, a normally closed reset push button switch 127 is also provided on panel 22 and is operative, when opened by the teller or attendant, to negative or avoid the control functions initiated by prior closing of either of the switches 125 or 126.

Switch 125 is associated with a relay A having three sets of contacts $a_1$, $a_2$, $a_3$, contacts $a_1$ and $a_2$ being normally open while contacts $a_3$ are normally closed, as shown, and switch 126 is associated with a relay B having normally open contacts $b_1$ and $b_2$ and normally closed contacts $b_3$. A transformer 128 has its primary winding energized from the power supply 121, and the secondary winding of that transformer forms the power supply for alternative energization of the windings of the relays A and B. As shown in Fig. 9, a circuit for energizing the winding or coil of relay A has the switches 125 and 127, the secondary winding of transformer 128 and the normally closed contacts $b_3$ of relay B all connected in series with the winding of relay A so that the latter will be energized upon closing of switch 125 at panel 22. When relay A is energized, the contacts $a_1$ and $a_2$ are closed while contacts $a_3$ are opened, and a complete circuit for countinuing the energization of relay A is then provided through the secondary of transformer 128, closed contacts $a_1$ of relay A and closed reset switch 127 so that the push button switch 125 can be released and relay A will be held in its closed condition.

The gate valves 60, 62, 63 and 65 (Fig. 2) are operated by solenoids 60a, 62a, 63a and 65a, respectively, and are arranged to be closed when the related solenoids are deenergized and to be opened upon energizing of the related solenoids.

As seen in Figs. 2 and 10, the coils of solenoids 62a and 63a are connected, in parallel, to conductors 129 and 130 which are respectively connected to one side of the power supply 121 and to the other side of that power supply through the normally open contacts $a_2$ of relay A. Thus, when contacts $a_2$ are closed by energization of relay A, a complete circuit is provided for energizing the solenoids 62a and 63a, thereby opening the related gate valves 62 and 63.

The coil of solenoid 124, which operates latch 106, is also connected in parallel with the solenoids 62a and 63a by way of branch conductors 129a and 130a extending from conductors 129 and 130, respectively. Thus, the latch 106 is retracted at the same time as valves 62 and 63 are opened to provide airflow through the tube 51 in the direction from terminal 52 to terminal 53, and retraction of latch 106 permits movement of the carrier 54 away from terminal 52 in the direction of such airflow.

As shown in Fig. 10, a circuit for energizing the winding or coil of relay B has the secondary of transformer 128, the switches 126 and 127, and the normally closed contacts $a_3$ of relay A connected in series therewith so that relay B will be energized upon closing of switch 126 at panel 22 only if the relay A is de-energized at that time. When relay B is energized, contacts $b_1$ and $b_2$ are closed while contacts $b_3$ are opened, thereby to automatically interrupt or lock-out the circuit for energizing relay A which has the contacts $b_3$ in series therewith, as previously mentioned. Closing of contacts $b_1$ of relay B completes an alternative circuit for energizing relay B so that push-button switch 126 can then be released and relay B will be held in its energized condition.

As seen in Figs. 2 and 10, the coils of solenoids 60a and 65a are connected, in parallel, to the conductor 129 permanently connected to one side of power supply 121 and to a conductor 131 which is adapted to be connected to the other side of the power supply 121 through the normally open contacts $b_2$ of relay B, while the conductor 122, which extends to the movable contact of limit switch 120, branches off from the conductor 131.

Thus, when relay B is energized to close the contacts $b_2$ thereof, the solenoids $60a$ and $65a$ are energized to open the related valves 60 and 65 so that the gate valve and compressor assembly 56 then produces an airflow through tube 51 in the direction from terminal 53 to terminal 52. Since the normally closed contacts $a_3$ and $b_3$ of the relays A and B serve as lock-out contacts for the relays B and A, respectively, that is, permit the energization of the relay A only when relay B is de-energized and permit the energization of relay B only when relay A is de-energized, it is apparent that the paired gate valves 62 and 63 and the paired gate valves 60 and 65 of the assembly 56 can only be alternately opened. Thus, when valves 62 and 63 are opened, valves 60 and 65 are closed and, when valves 60 and 65 are opened, valves 62 and 63 are closed, thereby to provide the desired reversible airflow through tube 51, as previously described in detail.

Further, a conductor 132 extends from the fixed contact of limit switch 120 which is engaged by the movable contact, when the latter is depressed, to one side of the coil of solenoid 123, and a conductor 133 extends from the other side of solenoid 123 to the side of power supply 121 to which the conductor 129 is connected.

Thus, when carrier 54 is in terminal 53 at the customer's station and the service door 99 is open, closing of switch 126 at panel 22 completes a circuit through contacts $b_2$ of relay B, conductor 122, limit switch 120 in its free condition, depressed limit switch 108 and motor 109 to operate the latter and cause closing of service door 99. When the latter is fully closed, thereby to depress limit switch 120, the circuit to motor 109 is interrupted, and a complete circuit is then formed through contacts $b_2$ of relay B, conductor 122, depressed limit switch 120, conductor 132, solenoid 123 and conductor 133, so that latch 104 is released or retracted and the carrier 54 is then free to be moved by the airflow through tube 51 resulting from the energization of solenoids $60a$ and $65a$.

Figure 4:
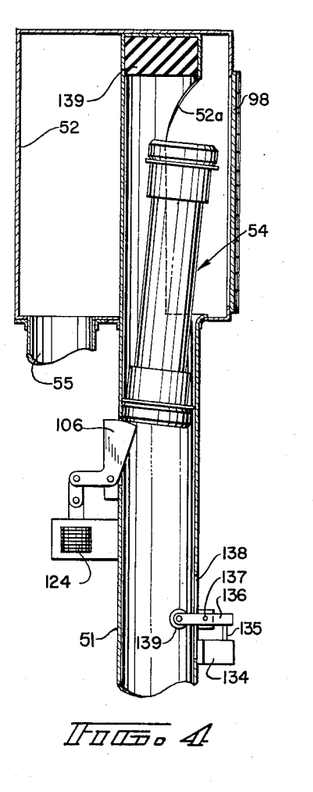
Fig. 4 is an enlarged vertical sectional view taken through the center of the terminal of the pneumatic tube system of Fig. 2 at the attendant's station.

In order to cause deceleration of the carrier 54 as the latter nears terminal 52 at the teller's station, the energized relay B is automatically de-energized, thereby to close gate valves 60 and 65, as well as the already closed gate valves 62 and 63, so that the airflow through tube 51, in the direction of the broken arrows (Fig. 2), is interrupted and the inertia of the carrier causes the movement of the latter through the remaining distance into the terminal 52. The above described automatic de-energization of the relay B as the carrier nears the terminal 52 is effected by a normally closed switch 134 (Figs. 2, 4 and 10) which is connected in series with the coil of relay B in the circuit for energizing the latter and adapted to be actuated, to its open condition, by the carrier 54 as the latter moves through the tube 51 past a location a short distance below terminal 52. Since the normally closed switch 134 is also in series with the coil of relay A in the circuit for energizing the latter of the wiring diagram of Fig. 10, an arrangement is provided to ensure that the switch 134 will be actuated to its open condition by the carrier 54 only during movement of the latter resulting from energization of relay B, that is, during movement of the carrier in the direction from terminal 53 to terminal 52, and that the switch 134 will remain in its closed condition during movement of carrier 54 in the direction from terminal 52 to terminal 53. As seen in Fig. 4, the switch 134 may be mounted on tube 51 at a location a short distance below terminal 52 and have an actuating plunger 135 extending from the switch housing and adapted to separate or open the normally closed contacts of the switch in response to depression of plunger 135 into the switch housing. An actuating lever 136 may be pivotally mounted, as at 137, on the tube 51 and have an end portion extending through an opening 138 into the interior of the tube. A roller 139 may be provided on the end of lever 136 projecting into tube 51 for engagement by carrier 54 as the latter moves through tube 51 while the opposite end of lever 136 is adapted to bear downwardly on plunger 135. Thus, when carrier 54 moves past lever 136 in the direction toward terminal 52, the carrier rocks lever 136 in the clockwise direction, as viewed on Fig. 4, thereby depressing plunger 135 to open normally closed switch 134. On the other hand, when carrier 54 moves through tube 51 past lever 136 in the direction away from terminal 52, lever 136 is rocked in the counter-clockwise direction and merely moves away from plunger 135 so that switch 134 remains in its closed condition and the circuit energizing relay A is uninterrupted.

From the foregoing, it will be apparent that the flow of air through tube 51 causing rapid movement of carrier 54 toward terminal 52 is halted as the carrier passes the actuating lever 136 of switch 134 so that the inertia of the carrier is relied upon for the final movement of the latter into terminal 52. Further, the stop of carrier 54 in terminal 52 may be cushioned by a rubber, or other resilient bumper 139 at the top of terminal 52.

Since the pneumatic tube system 50 has only a single tube 51 extending between the terminals 52 and 53 at the teller's and customer's stations, such system for transferring articles between the teller and customer can be conveniently installed even when a limited space is available therefor or when it is necessary for the tube 51 to follow a tortuous path around fixed obstructions in the path of a straight line between the stations. Further, since the pneumatic tube system 50 characteristicly produces a high speed of travel of carrier 54 through tube 51, a relatively large distance can exist between the two stations without requiring long periods of time for the transferring of articles between the stations. The use of large distances between the teller's and customer's stations is further made possible by the employment of the described two-way oral and visual communication systems which operate efficiently without regard to the relative positions of, or distances between, the stations. Since the article transferring system and the oral and visual communication systems are operated exclusively from the teller's station, damage to the apparatus by vandalism or by improper operation by a customer is completely avoided.

Although a particular illustrative embodiment of the invention has been described in detail herein with reference to the accompanying drawings, it is to be understood that the invention is not limited to that particular embodiment, and that various changes and modifications may be effected therein without departing from the scope or spirit of the claims, except as defined in the appended claims.

What is claimed is:

1. A drive-in service apparatus particularly adapted for the transaction of banking business, comprising means defining an attendant's station, a housing remote from said attendant's station and defining a customer's station, an electronic system for effecting oral communication between a customer and an attendant at said stations and being controllable only from said attendant's station, a two-way, closed-circuit television system including a television camera at each of said stations and a television receiver at each of the stations normally operative to present a picture of an image picked up by the camera at the other of the stations to thereby establish two-way visual communication between stations, said housing having an opening for article transfers and a door mounted thereon for movements from and to a position closing said opening, a pneumatic tube system including a single tube extending between terminals at said attendant's station and at said customer's station behind said opening, carrier movable through said tube between the terminals of the latter and adapted to contain articles to be transferred between a customer and attendant, air propelling means for producing air flow through said tube alternatively in opposed directions, latch means at each of said terminals engageable with said carrier for holding the latter against movement away from the related terminal, door actuating means operative to open and close said door of the housing at said customer's station, and control means for said air propelling means, latch means and door actuating means disposed at said attendant's station and actuable only from said attendant's station, said control means being effective, in a first condition, to operate said air propelling means for an air flow through said tube in the direction from said attendant's station to said customer's station, to release said latch means at the attendant's station and to cause said door actuating means to open said door following the arrival of said carrier at said terminal at the customer's station, and in a second condition, to cause said door actuating means to close said door and, thereafter, to release said latch means at the customer's station and to operate said air propelling means for an air flow through said tube in the direction from said customer's station to said attendant's station.

2. In a drive-in service apparatus of the described character; a pneumatic tube system for transferring articles between an attendant's station and a remote customer's station comprising a tube extending between terminals at the attendant's and customer's stations, respectively, a carrier movable through said tube between said terminals in response to air flow in the tube in opposed directions, said terminals at the attendant's and customer's stations having openings in the sides thereof which are respectively larger and smaller than said carrier so that the latter is removable from said tube only at said terminal at the attendant's station, said carrier including a housing open at one side, a box-like portion hingedly mounted at said open side of the housing to swing between a closed position covering said open side of the housing and an open position projecting out of said housing, said box-like portion of the carrier being dimensioned to extend through said opening of the terminal at the customer's station when in its open position, a cover hingedly mounted on said box-like portion and closing the latter within said housing when said box-like portion is in its closed position, and means opening said cover relative to said box-like portion in response to movement of the latter to its open position so that, when said carrier is disposed in said terminal at the customer's station, said box-like portion can be moved to its open position to receive and discharge articles to be transferred between the stations.

3. In a drive-in service apparatus of the described character; a pneumatic tube system for transferring articles between an attendant's station and a remote customer's station comprising a tube extending between terminals at the attendant's and customer's stations, respectively, a carrier movable through said tube between said terminals in response to air flow in the tube in opposed directions, said terminals at the attendant's and customer's stations having openings in the sides thereof which are respectively larger and smaller than said carrier so that the latter is removable from said tube only at said terminal at the attendant's station, and said carrier having a hinged side portion mounted thereon to swing from a normal closed position to an open position projecting through said opening of said terminal at the customer's station thereby to afford access to the interior of the carrier when the latter is disposed at said terminal at the customer's station, and roller means projecting from said hinged side portion and engageable with the interior of said tube during movement of the carrier through the latter to maintain said hinged side portion substantially in said closed position, thereby to prevent loss of articles from said carrier during movement of the latter between the stations.

4. In a drive-in service apparatus of the described character; a pneumatic tube system for transferring articles between an attendant's station and a remote customer's station comprising a tube extending between terminals at the attendant's and customer's stations, respectively, a carrier movable through said tube between said terminals in response to air flow in the tube in opposed directions, said terminals at the attendant's and customer's stations having openings in the sides thereof which are respectively larger and smaller than said carrier so that the latter is removable from said tube only at said terminal at the attendant's station, said carrier having a hinged side portion mounted thereon to swing from a normal closed position to an open position projecting through said opening of the terminal at the customer's station, resilient means urging said side portion to the open position of the latter, latch means for holding said side portion in said closed position and being releasable through said opening of the terminal at the customer's station for affording access to the interior of the carrier when the latter is disposed at said terminal at the customer's station, and roller means projecting from said hinged side portion and engageable with the interior of said tube during movement of the carrier through the latter to maintain said hinged side portion substantially in said closed position in the event of a failure of said latch means, thereby to prevent loss of articles from said carrier during movement of the latter between the stations.

5. In a drive-in service apparatus of the described character; a pneumatic tube system for transferring articles between an attendant's station and a remote customer's station comprising a tube extending between terminals at the attendant's and customer's station, respectively, a carrier movable through said tube between said terminals in response to airflow in the tube in opposed directions, said terminals at the attendant's and customer's stations having openings in the sides thereof which are respectively larger and smaller than said carrier so that the latter is removable from said tube only at said terminal at the attendant's station, and said carrier having a hinged side portion mounted thereon to swing downwardly and outwardly from a normal closed position to an inclined open position projecting through said opening of said terminal at the customer's station thereby to afford access to the interior of the carrier when the latter is disposed at said terminal at the customer's station, and means along the lower edge of said opening of the terminal at the customer's station adapted to bear against said hinged side portion and to swing the latter toward said closed position thereof as said carrier commences movement out of said terminal at the customer's station toward the other of said terminals.

References Cited in the file of this patent

UNITED STATES PATENTS

| | | |
|---|---|---|
| 974,799 | Jacques | Nov. 8, 1910 |
| 1,009,316 | Jennings | Nov. 21, 1911 |
| 1,032,141 | Jennings | July 9, 1912 |
| 1,134,402 | Needham | Apr. 6, 1915 |
| 1,695,785 | Stoetzel | Dec. 18, 1928 |
| 1,971,142 | Jennings | Aug. 21, 1934 |
| 2,017,883 | Zworykin | Oct. 22, 1935 |
| 2,137,750 | Busch | Nov. 22, 1938 |
| 2,314,471 | Wright | Mar. 23, 1943 |
| 2,698,721 | Van Otteren | Jan. 4, 1955 |
| 2,700,433 | Ellithorpe | Jan. 25, 1955 |
| 2,763,446 | Hanson | Sept. 18, 1956 |